US 6,463,129 B1

United States Patent
Park

(10) Patent No.: US 6,463,129 B1
(45) Date of Patent: Oct. 8, 2002

(54) CALL SCREENING METHOD OF A FACSIMILE SYSTEM HAVING A STATIONARY MAIN UNIT CONNECTED TO A TELEPHONE NETWORK AND A CORDLESS PORTABLE UNIT

(75) Inventor: Joo-Seung Park, Kyongsangbuk-do (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/129,847

(22) Filed: Aug. 6, 1998

(30) Foreign Application Priority Data

Aug. 9, 1969 (KR) .............................. 97-37554

(51) Int. Cl.⁷ ............................. H04M 1/64; H04Q 7/20
(52) U.S. Cl. .................. 379/67.1; 379/88.19; 455/412; 455/426; 455/567
(58) Field of Search ............................ 379/67.1, 88.17, 379/100.01, 905, 85, 88.16, 88.19, 88.22, 93.24, 93.08, 142.07, 185, 192.01, 88.13; 455/412, 426, 462, 567

(56) References Cited

U.S. PATENT DOCUMENTS

| | | | |
|---|---|---|---|
| 4,677,655 A | | 6/1987 | Hashimoto .................. 455/412 |
| 4,881,259 A | * | 11/1989 | Scordato ...................... 379/58 |
| 4,908,851 A | | 3/1990 | Kotani et al. .......... 379/100.15 |
| 5,086,455 A | | 2/1992 | Satomi et al. ......... 379/100.16 |
| 5,159,624 A | * | 10/1992 | Makita ........................ 379/57 |
| 5,200,991 A | | 4/1993 | Motoyanagi ................. 455/465 |
| 5,333,179 A | | 7/1994 | Yamamoto et al. ........ 379/67.1 |
| 5,353,329 A | | 10/1994 | Hayashi ....................... 455/556 |
| 5,426,511 A | | 6/1995 | Nagatomo ................... 358/402 |
| 5,442,463 A | | 8/1995 | Ohnishi ................. 379/100.16 |
| 5,444,771 A | | 8/1995 | Ohnishi ................. 379/100.16 |
| 5,481,596 A | * | 1/1996 | Comerford .................... 379/67 |
| 5,487,105 A | | 1/1996 | Sakai ..................... 379/100.16 |
| 5,517,557 A | | 5/1996 | Tanaka ..................... 379/88.21 |
| 5,684,608 A | | 11/1997 | Charbonnier et al. ........ 358/442 |
| 5,912,948 A | * | 6/1999 | Nelson et al. ................. 379/79 |
| 5,953,656 A | * | 9/1999 | Bertocci et al. ............. 455/412 |
| 6,104,923 A | * | 8/2000 | Kite ............................ 455/412 |
| 6,148,213 A | * | 11/2000 | Bertocci et al. ............. 455/462 |
| 2001/0019955 A1 | * | 9/2001 | Henderson ................... 455/426 |

* cited by examiner

Primary Examiner—Fan Tsang
Assistant Examiner—Ovidio Escalante
(74) Attorney, Agent, or Firm—Robert E. Bushnell, Esq.

(57) ABSTRACT

A call screening method for a facsimile system having a stationary main unit connected to a telephone network and at least one cordless portable unit for enabling a user to screen an incoming call during an automatic telephone answering function. A telephone answering device incorporated into the stationary main unit is used to record an incoming message of an incoming call received from the telephone network while performing an automatic telephone answering function. A RF transceiver is used to form a radio communication link with the cordless portable unit of the facsimile system in order to output the incoming message as received at the stationary main unit to a speaker, of the cordless portable unit while the incoming message is being recorded in the telephone answering device at the stationary main unit to permit the user to screen an incoming call.

25 Claims, 4 Drawing Sheets

CALL SCREENING METHOD OF A FACSIMILE SYSTEM HAVING A STATIONARY MAIN UNIT CONNECTED TO A TELEPHONE NETWORK AND A CORDLESS PORTABLE UNIT

CLAIM FOR PRIORITY

This application makes reference to, incorporates the same herein, and claims all benefits accruing under 35 U.S.C. §119 from an application for CALL SCREENING METHOD IN FACSIMILE APPARATUS WITH PORTABLE UNIT earlier filed in the Korean Industrial Property Office on the $6^{th}$ of Aug. 1997, and there duly assigned Ser. No. 37554/1997, a copy of which application is annexed hereto.

BACKGROUND OF THE INVENTION

1. Technical Field

The present invention relates to a call screening method in a facsimile apparatus with a portable unit, and more particularly to a call screening method for outputting an incoming message to a speaker of a portable unit while the incoming message is recorded in a main unit of the facsimile having a telephone answering function.

2. Related Art

Generally, a facsimile system having an automatic telephone answering function as disclosed, for example, in U.S. Pat. No. 4,908,851 for Facsimile Apparatus Operable In Facsimile Or Conversation Mode issued to Kotani et al., U.S. Pat. No. 5,086,455 for Facsimile Arrangement Having Automatic Answering Telephone Set And Facsimile Set And Switching Process Therefor issued to Satomi et al., U.S. Pat. No. 5,333,179 for Facsimile Apparatus With Automatic Answering Telephone Function issued to Yamamoto et al., U.S. Pat. No. 5,442,463 for Facsimile Machine Having Telephone Answering Function issued to Ohnishi, U.S. Pat. No. 5,444,771 for Facsimile Machine Having Answering Function issued to Ohnishi, U.S. Pat. No. 5,487,105 for Facsimile Apparatus Operable In Facsimile Or Telephone Mode issued to Sakai, and U.S. Pat. No. 5,517,557 for Facsimile Apparatus With Automatic Telephone Answering Function issued to Tanaka, includes a facsimile module for facsimile communication, an attached telephone for telephone communication, and a recording device for recording a voice message from a caller. Typically, the facsimile system is connected directly via a telephone line for access to the public switched telephone network. When a remote caller wants to call or send a facsimile to a host facsimile system, the caller accesses the host facsimile system by dialing its telephone number via a remote telephone or a remote facsimile system. If a caller sends a signal via a telephone when the facsimile system answers in a telephone/facsimile mode, telephone conversation is permitted. If the caller sends a signal via a remote facsimile system when the facsimile system answers in the same telephone/facsimile mode, facsimile communication is permitted. On the other hand, if the caller sends a signal via a telephone when the facsimile system answers in an answering/facsimile mode, an answering message is transmitted to the caller upon signal reception and a voice message from the caller is recorded. If the caller sends a signal via a remote facsimile system when the facsimile system answers in the answering/facsimile mode, facsimile communication is permitted.

In recent years, facsimile systems have become ubiquitous and are commonly available both in the workplace and in the home office. Facsimile technology has become more desirable as a means to efficiently facilitate telephonic communication between subscribers. For example, cordless telephone sets with automatic answering function as disclosed in U.S. Pat. No. 4,677,655 for Cordless Telephone With Automatic Telephone Answering/Recording Function issued to Hashimoto, and U.S. Pat. No. 4,881,259 for Answering Machine With Cordless Telephone issued to Scordato, have been incorporated into a facsimile system in the manner described by, for example, U.S. Pat. No. 5,200,991 for Image Communication System Including a Mobile Telephone Set And A Facsimile Device issued to Motoyanagi, and U.S. Pat. No. 5,353,329 for Facsimile Apparatus And Alarm System With Cordless Telephone Set issued to Hayashi, provide for greater ease of telephonic and facsimile communications between subscribers. Other cordless types of facsimile systems are disclosed in U.S. Pat. No. 5,426,511 for Facsimile System With Base Unit Connected To Wire Network And In Communication With Multiple Extension Sets By Wire Or Radio Transmission issued to Nagatomo, and U.S. Pat. No. 5,684,608 for Cordless Communication Facsimile System issued to Charbonnier et al. In Nagatomo '511, the facsimile system is stationary and connected to a telephone network but a plurality of portable extension sets in the form of scanners are cordless and mobile for multiple users to share the common facsimile system. In Charbonnier '608, the facsimile system is intended to operate in two modes: a handset mode in which the system is used as a cordless telephone handset, and a base mode in which the system is used as a conventional facsimile system.

Some recent models of facsimile systems with an automatic telephone answering function, as I have observed, may also provide a call screening function for permitting the user (subscriber) to listen to an incoming massage while the incoming message is being recorded during the automatic telephone answering function. However, when the user is far away from the facsimile system, he/she cannot hear the incoming message. Therefore, there is a need for a facsimile system, as I have observed, that is capable of alerting a user of an incoming message while the incoming message is being recorded even when the user is far away from the facsimile system.

SUMMARY OF THE INVENTION

According, it is an object of the present invention to provide a new and improve facsimile system having an automatic telephone answering function.

It is also an object to provide a facsimile system having a main unit connected to a telephone network and at least one portable unit that is cordless and mobile relative to the main unit for call screening during an automatic telephone answering function.

It is another object to provide a call screening method of a facsimile system having a stationary main unit and a cordless, mobile portable unit at a location remote from the main unit for performing a call screening function.

It is yet another object to provide a call screening method of a facsimile system having a stationary main unit and a cordless, mobile portable unit for alerting a user of an incoming message at the cordless, mobile portable unit while the incoming message is being recorded in the main unit of the facsimile system.

These and other objects of the present invention can be achieved by a call screening method of a facsimile system having a station main unit connected to a telephone network and a cordless portable unit. The method comprises the steps of: recording an incoming message of an incoming call received from the telephone network in a telephone answering device of the facsimile system while performing a telephone answering function; forming a radio communication link between the stationary main unit of the facsimile system and the cordless portable unit; and outputting the incoming message to a speaker of the cordless portable unit through the radio communication link while the incoming message is being simultaneously recorded in the telephone answering device to permit a user to screen an incoming call.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detail description when considered in conjunction with the accompanying drawings, in which like reference symbols indicate the same or similar elements components, wherein.

DETAILED DESCRIPTION OF THE PREFERRED EMBODIMENT

Figure 1:
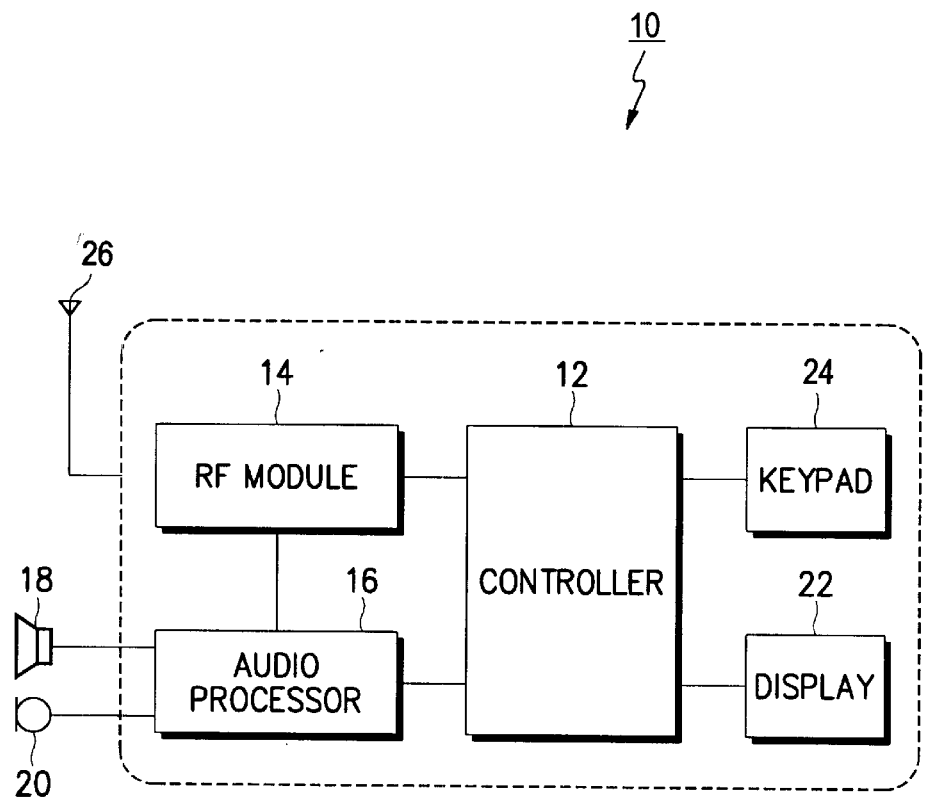
FIG. 1 is a block diagram of a cordless, mobile portable unit of a facsimile system constructed according to the principles of the present invention.
Figure 2:
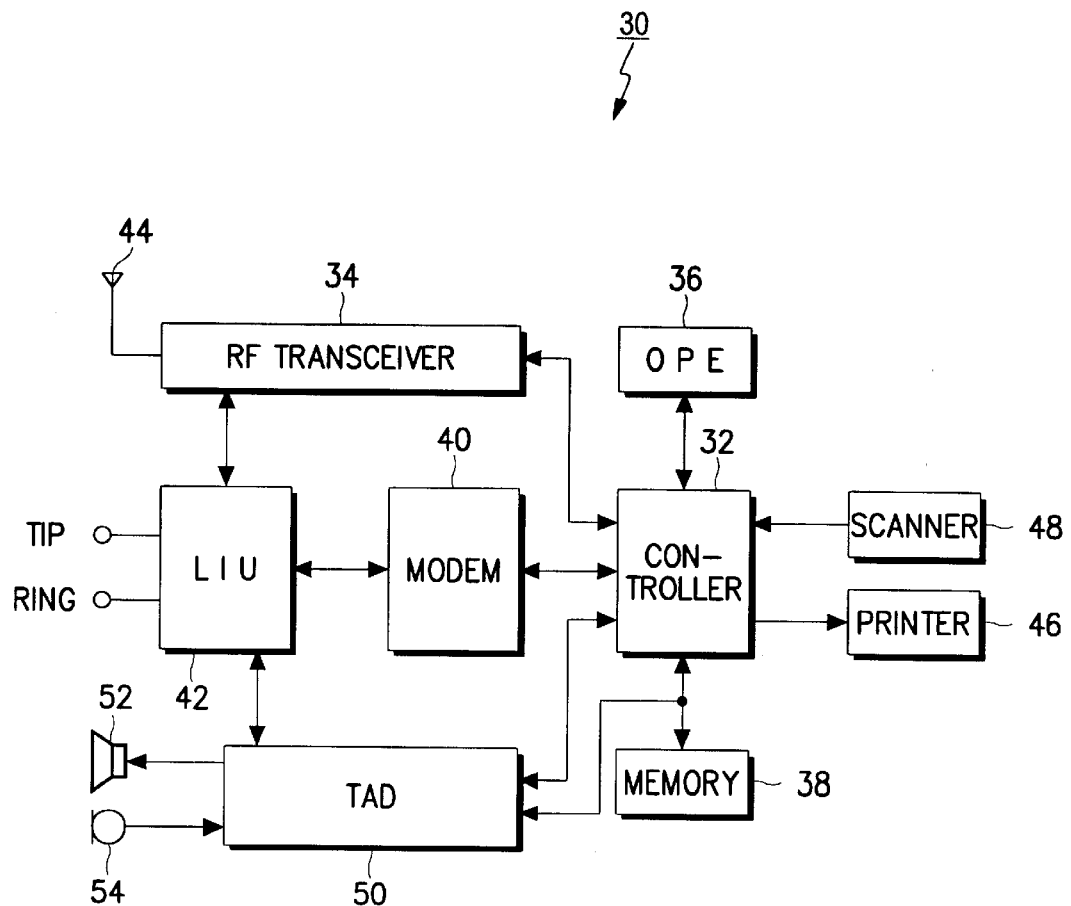
FIG. 2 is a block diagram of a stationary main unit of a facsimile system constructed according to the principles of the present invention.

Referring now to the drawings and particularly to FIGS. 1 and 2, which collectively illustrate a facsimile system having a main unit 30 that is stationary and connected to a telephone network and at least one portable unit 10 that is cordless and mobile relative to the main unit 30 for call screening during an automatic telephone answering function according to the principles of the present invention. As shown in FIG. 1, the cordless, mobile portable unit 10 includes a portable unit controller 12 for controlling overall operations of the portable unit 10 including a call screening function. The controller 12 contains a memory (not shown) for storing a password of the portable unit and a call screening program for performing the call screening function. The portable unit 10 also includes a radio frequency (RF) module 14, an audio processor 16, a speaker 18, a microphone 20, a display 22, a keypad 24 and an antenna 26 for wireless or radio communication with the main unit 30 of the facsimile system. The keypad 24 contains input keys for setting up various functions and modes and numeric keys for dialing, and for outputting to the portable unit controller 12 key data corresponding to a key pushed by the user. Under the control of the portable unit controller 12, the RF module 14 outputs a transmission audio signal output from the audio processor 16 or data output from the portable unit controller 12 through an antenna 24, demodulates a radio signal received through the antenna 24, outputs the demodulated signal to the audio processor 16 and outputs received control data to the potable unit controller 12. The audio processor 16 processes an audio signal input from the microphone 20 or the demodulated signal received from the RF module 14 and outputs the processed audio signal to the speaker 18. The display 22 provides a visual display of a variety of operational states and telephone numbers under the control of the portable unit controller 12.

As shown in FIG. 2, the main unit 30 of the facsimile system includes a main unit controller 32 for controlling overall operations of the main unit 30 to perform the call screening function of the invention, a radio frequency (RF) transceiver 34, an operational panel equipment (OPE) 36, a memory 38, a modem 40, a line interface unit (LIU) 42 connected to a telephone network, an antenna 44, a printer 46, a scanner 48, a telephone answering device (TAD) 50, a speaker 52 and a microphone 54 for permitting the user at a remote location to screen call by way of a portable unit 10. The memory 38 includes a ROM (Read Only Memory) for storing a program of the invention and a RAM (Random Access Memory) for temporarily storing data generated in the course of performing the program. and stores incoming and outgoing messages. The RF transceiver 34 modulates a transmission signal according to a control signal of the main unit controller 32, radiates the modulated transmission signal through an antenna 44, demodulates a radio signal received through the antenna 44 into an audio band signal, and simultaneously outputs the received control data to the main unit controller 32. The OPE 36 includes a multitude of keys for setting up or commanding functions provided from the facsimile system and providing key data generated by pushing of the keys to the main unit controller 32. Additionally, the OPE 36 includes a display window for providing a visual display of a current operating status of the facsimile system according to the control signal of the main unit controller 32. The modem 40 demodulates a modulation signal input through a LIU (Line Interface Unit) 42, modulates a signal to be transmitted through the LIU 42 to a telephone line, and performs dialing according to the control signal of the main unit controller 32. The LIU 42 connects the telephone line to the modem 40 according to the control signal of the main unit controller 32, detects a ring signal of an incoming call, and provides the detected ring signal to the main unit controller 32. The scanner 48 reads image data of a manuscript and converts photo-electrically the read image data to binary data. Likewise, the printer 46 prints the received image data or reads image data according to the control signal of the main unit controller 32. The telephone answering device (TAD) 50 synthesizes an outgoing message stored in the memory 38 according to the control signal of the main unit controller 32, and outputs the outgoing message to a speaker 52 and the LIU 42. In addition, the telephone answering device 50 analyzes an incoming message input through the LIU 42 or an audio signal input from a microphone 54, and stores the analyzed message or the audio signal in the memory 38.

Figure 3:
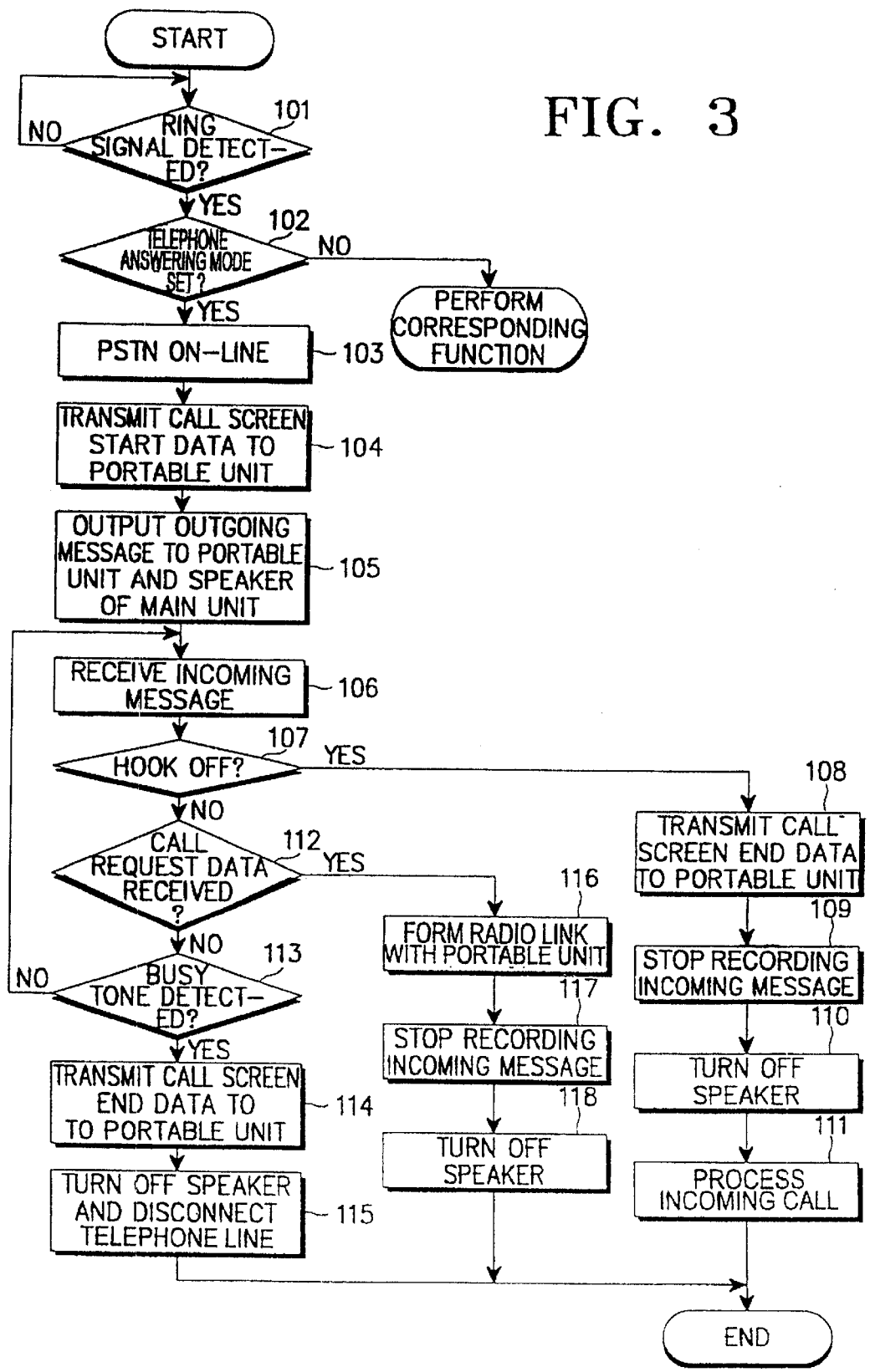
FIG. 3 is a control flowchart of the main unit of a facsimile system for performing a call screening function in accordance with a preferred embodiment of the present invention.
Figure 4:
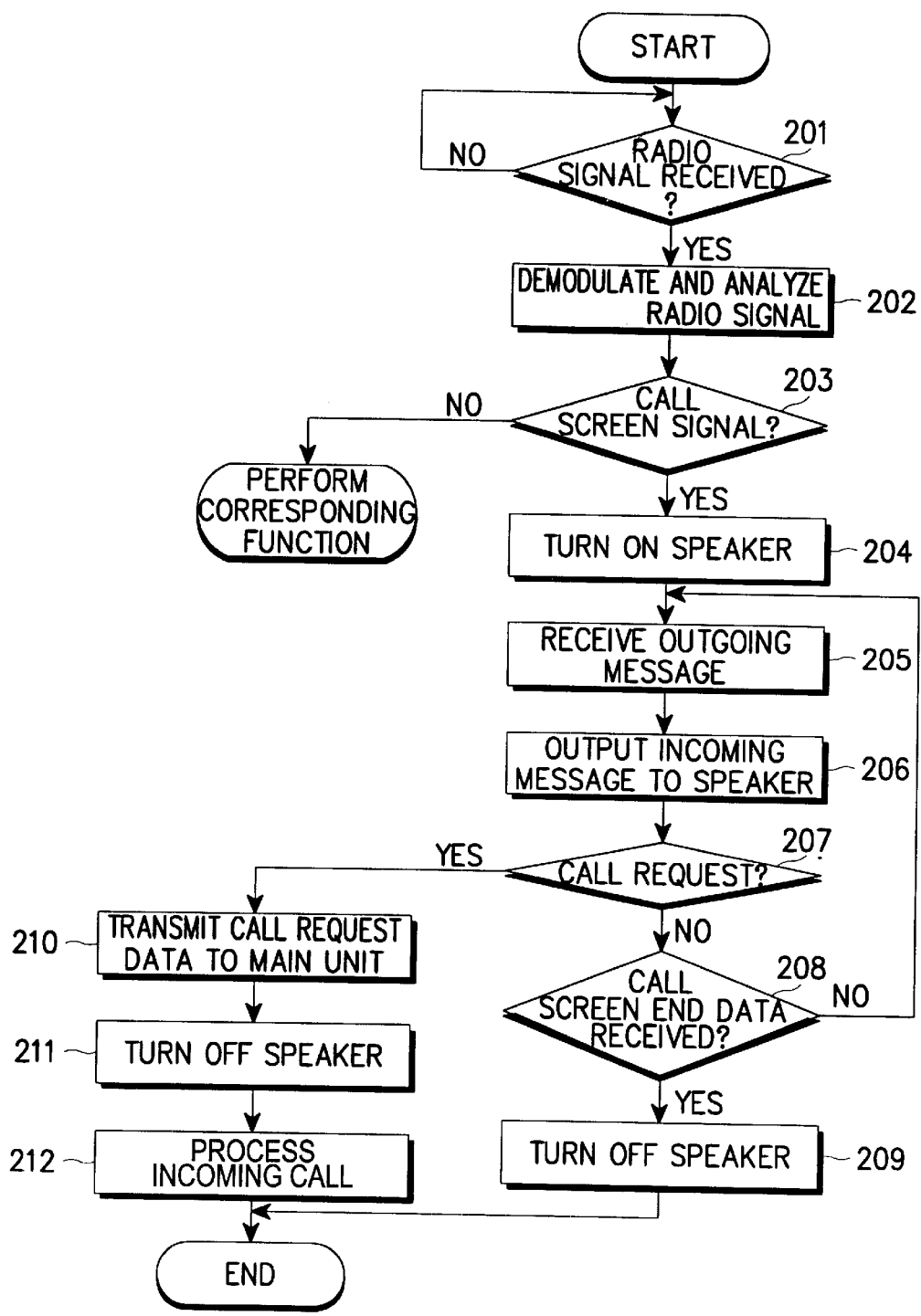
FIG. 4 is a control flowchart of the portable unit of a facsimile system for performing a call screening function in accordance with a preferred embodiment of the present invention.

FIGS. 3 and 4 show control flowcharts of the stationary main unit 30 of a facsimile system and the portable unit 10, respectively, for performing a call screening function in accordance with the preferred embodiment of the present invention. The operations of the call screening function according to the preferred embodiment of the present invention will now described in detail with reference to FIGS. 1 to 4 as follows.

In step 101, the main unit controller 32 of the main unit 10 first determines whether a ring signal indicating an incoming call is detected by the LIU 42 from a telephone network. If the ring signal is detected from the telephone network, the main unit controller 32 determines whether a telephone answering mode is set up at step 102. If the telephone answering mode is not set up at step 102, the main unit controller 32 performs a corresponding function. However, if the telephone answering mode is set up at step 102, the main unit controller 32 controls the LIU 42 to establish an on-line condition between the facsimile system and a public switched telephone network (PSTN) at step 103. After the PSTN is on-line, the main unit controller 32 of the main unit 30 transmits call screen start data in the form of a radio signal to the portable unit 10 through the RF transceiver 34 and the antenna 44 at step 104.

At this time, the portable unit controller 12 of the portable unit 10 determines whether a radio signal is received from the main unit 30 of the facsimile system at step 201. If the radio signal is received from the main unit 30, the portable unit controller 12 demodulates the radio signal as received from the main unit 30 and analyzes the demodulated signal at step 202. Next, the portable unit controller 12 determines whether the analyzed signal is a call screen signal at step 203. If the analyzed signal is not the call screen signal, the corresponding functions are performed. However, if the analyzed signal is the call screen signal, the portable unit controller 12 controls the audio processor 16 and turns on the speaker 18 to output therethrough the audio signal received from the main unit 30 of the facsimile system at step 204.

Meanwhile, in step 105, the main unit 30 of the facsimile system controls the telephone answering device (TAD) 50 to read an outgoing message stored in the memory 38. The read outgoing message is synthesized into an audio signal. The synthesized audio signal is transmitted to the public switched telephone network (PSTN) through the LIU 42, and is also modulated into a radio signal by the RF transceiver 34 to be transmitted to the portable unit 10 of the facsimile system through the antenna 44. In addition, the synthesized outgoing message is output to the speaker 52.

Then, in step 205, the portable unit 10 receives an outgoing message modulated into a radio signal through the antenna 24 and the RF module 14, processes the outgoing message into an audio signal by means of the audio processor 16, and outputs the audio signal to the speaker 18.

After transmitting the outgoing message, the main unit controller 32 receives the incoming message through the LIU 42 and controls the telephone answering device (TAD) 50 to convert the incoming message into a digital signal at step 106. The converted digital signal is stored in the memory 38, and simultaneously output to the speaker 52. In addition, the incoming message is modulated into a radio signal by the RF transceiver 34 and transmitted to the portable unit 10 of the facsimile system through the antenna 44.

Then, in step 206, the portable unit controller 12 of the portable unit 10 controls the audio processor 16 to process an incoming message received through the RF module 14 into an audio signal. The audio signal is output to the speaker 18.

Next, in step 107, the main unit controller 32 determines whether the facsimile system is off hooked and proceeds to step 108 if it is off hooked. In step 108, the main unit controller 32 modulates call screen end data into a radio signal by means of the RF transceiver 34 and transmits the radio signal to the portable unit 10 through the antenna 44. In step 109, the main unit controller 32 controls the telephone answering device (TAD) 50 to stop recording the incoming message. In step 110, the main unit controller 32 turns off the speaker 52. In step 111, the main unit controller 32 processes the incoming call and, after completion of the call, terminates the program.

However, while the portable unit 10 demodulates the received radio signal and outputs the incoming message to the speaker 18 at step 206, if the user of the portable unit pushes a call start key on the keypad 10, he/she can talk over the portable unit 10 with the other subscriber. Upon checking whether the call start key is pushed at step 207, if the call start key is pushed, the portable unit controller 12 controls the RF module 14 to modulate call request data into a modulated radio signal for transmission to the main unit 10 of the facsimile system through the antenna 24 at step 210. After the transmission, the portable unit controller 12 turns off the speaker 18 at step 211, and processes the incoming call at step 212.

Meanwhile, the main unit 30 of the facsimile system determines whether the call request data is received from the potable unit 10 at step 112. If the call request data is received at step 112, the main unit controller 32 forms a radio communication link with the portable unit 10 at step 116. In step 117, the main unit controller 32 controls the telephone answering device (TAD) 50 to stop recording the incoming message. In step 118, the speaker 52 is turned off. However, if the call request data is not received from the portable unit 10 at step 112, the main unit controller 32 determines whether a busy tone is detected from the PSTN at step 113. If the busy tone is not detected from the PSTN at step 113, the procedure returns to step 106. However, if the busy tone is detected from the PSTN at step 113, the main unit controller 32 proceeds to step 114, determining that the other party has hung up the telephone. In step 114, the main unit controller 32 controls the RF transceiver 34 to modulate call screen end data into a radio signal for transmission. The modulated radio signal is then transmitted to the portable unit 10 of the facsimile system through the antenna 44. Subsequently, the speaker 52 is turned off at step 115.

At this point, the portable unit 10 of the facsimile system determines whether the call screen end data is received from the main unit 30 of the facsimile system through the antenna 24 and RF module 14 at step 208. If the call screen end data is not received, the procedure returns to step 205, and otherwise, to step 209 to turn off the speaker 18 and terminate the program.

As described above, the main unit 30 of the facsimile system outputs both outgoing and incoming messages to the speaker of the portable unit 10 while performing the telephone answering function. Therefore, the user can utilize the call screening function, even at a location remote from the main unit 30 of the facsimile system, by using. the portable unit 10. By doing so, the user can selectively answer the incoming call as a result of listening to the incoming message.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A call screening method of a facsimile system having a stationary main unit connected to a telephone network and a cordless portable unit which is separate from said stationary main unit, comprising the steps of:

providing said cordless portable unit with a speaker which is integrally constructed with and built into said cordless portable unit and with a microphone;

further providing said cordless portable unit with a controller for controlling an overall operation of a call screening function, a radio frequency module connected to the controller for enabling wireless communication with the stationary main unit, and an audio processor connected to the controller, to the radio frequency module, to the microphone, and to the speaker for processing an audio signal received from the radio frequency module so as to output a processed audio signal to the speaker in order to alert the user to the incoming call, and for processing an audio signal input from the microphone so as to output a further processed audio signal to the radio frequency module for transmission to the stationary main unit;

initiating a telephone answering function in the stationary main unit by forming a radio communication link between said stationary main unit and said cordless portable unit;

initiating the call screening function by transmitting call screen start data from said stationary main unit to said cordless portable unit over said radio communication link;

turning on the speaker of the cordless portable unit in response to reception of said call screen start data by said cordless portable unit;

recording an incoming message of an incoming call received from said telephone network in a telephone answering device of the facsimile system while performing the telephone answering function; and outputting said incoming message to the speaker of said cordless portable unit through the radio communication link while said incoming message is being simultaneously recorded in said telephone answering device so as to permit a user to screen an incoming call by using said speaker of said cordless portable unit.

2. The call screening method of claim 1, wherein said controller includes a memory for storing a password of the cordless portable unit and a call screening program for performing the call screening function; and wherein said cordless portable unit is provided with a keypad containing input keys for setting up various functions and modes and numeric keys for dialing, and for outputting key data corresponding to a key pushed by the user to the controller, and with a display unit connected to the controller for providing a visual display of operational states and telephone numbers under the control of the controller.

3. The call screening method of claim 1, said stationary main unit comprising:

a line interface unit connected to the telephone network for receiving the incoming call from the telephone network;

a controller connected to said line interface unit for controlling an overall operation including the call screening function;

a memory for storing a call screening program to perform the call screening function and temporarily storing data generated during the call screening function, and for storing incoming and outgoing messages;

a radio frequency transceiver connected to said line interface unit and to said controller for enabling wireless communication with said cordless portable unit;

an operational panel connected to said controller, containing a multitude of keys for setting up or commanding functions provided from the facsimile system, and providing, to said controller, key data generated by pushing of the keys, and a display window for providing a visual display of a current operating status of the facsimile system, a scanner connected to said controller for reading image data of a recording medium and converting the read image data to binary data;

a printer connected to said controller for printing at least one of received image data and the read image data under the control of said controller; and a telephone answering device connected to said line interface unit and said controller for synthesizing an outgoing message stored in said memory and outputting the outgoing message to a speaker in the stationary main unit and to said line interface unit, and for analyzing at least one of an incoming message received from the telephone network via said line interface unit and an audio signal input from a microphone, and storing said at least one of the analyzed incoming message and the audio signal in said memory.

4. The call screening method of claim 1, further comprising the steps, prior to the initiating steps, of determining whether a ring signal is detected and whether a telephone answering mode is set, and establishing an on-line condition with a public switched telephone network when it is determined that a ring signal has been detected and the telephone answering mode is set.

5. The call screening method of claim 1, further comprising the step, after the initiating steps, of outputting an outgoing message to the cordless portable unit and to a speaker of the stationary main unit.

6. The call screening method of claim 1, further comprising the steps, prior to the step of turning off the speaker of the cordless portable unit, of determining whether a radio signal is received, and demodulating and analyzing the radio signal when it is determined that the radio signal is received.

7. The call screening method of claim 1, further comprising the steps of determining whether a call request is received, and, when a call request is not received, determining whether call screen end data are received, and, when the call screen end data are received, turning off the speaker of the portable unit.

8. A call screening method of a facsimile system having a main unit connected to a telephone network, and a portable unit that is cordless and remote from the main unit, comprising the steps of:

providing the portable unit with a speaker which is integrally constructed with and built into the portable unit;

upon detection of a ring signal from the telephone network, establishing an on-line condition between said main unit of the facsimile system and the telephone network, and transmit call screen start data by radio from said main unit to said portable unit;

turning on the speaker of said portable unit in response to reception of said call screen start data by said portable unit;

modulating an outgoing message outputted from a telephone answering device of the facsimile system and an incoming message received from the telephone network into a radio signal, and transmitting a modulated radio signal to said portable unit; and causing said portable unit to demodulate the modulated radio signal transmitted from said main unit of the facsimile system and to output the demodulated radio signal to said speaker of said portable unit;

said method further comprising the step, after the modulating step, of receiving the incoming message; and said method further comprising the steps, after the step of receiving the incoming message, of determining whether a hook off condition exists, and, when it is determined that the hook off condition exists, transmitting call screen end data to the portable cordless unit, stopping recording of the incoming message, turning off the speaker of the stationary main unit, and processing an incoming call.

9. The call screening method of claim 8, comprising the step of determining whether call request data are received, and, when it is determined that the call request data are received, forming a radio communication link with the portable cordless unit, and stopping recording of the incoming message.

10. The call screening method of claim further comprising the steps of transmitting call request data to said main unit of the facsimile system when a call start key on said portable unit is pressed while the incoming message is output to said speaker, and upon receipt of the call request data from said portable unit, stopping recording of the incoming message and forming a radio communication link with said portable unit to process the incoming call.

11. A call screening method of a facsimile system having a stationary main unit connected to a telephone network and a cordless portable unit which is separate from said stationary main unit, comprising the steps of:

providing said cordless portable unit with a speaker which is integrally constructed with and built into said cordless portable unit;

initiating a telephone answering function in the stationary main unit by forming a radio communication link between said stationary main unit and said cordless portable unit;

initiating a call screening function by transmitting call screen start data from said stationary main unit to said cordless portable unit over said radio communication link;

turning on the speaker of the cordless portable unit in response to reception of said call screen start data by said cordless portable unit;

recording an incoming message of an incoming call received from said telephone network in a telephone answering device of the facsimile system while performing the telephone answering function; and outputting said incoming message to the speaker of said cordless portable unit through the radio communication link while said incoming message is being simultaneously recorded in said telephone answering device so as to permit a user to screen an incoming call by using said speaker of said cordless portable unit;

said method further comprising the steps, after said initiating steps, of determining whether a hook off condition exists when an incoming message is received, and transmitting call screen end data to the cordless portable unit when it is determined that the hook off condition exists.

12. The call screening method of claim 11, further comprising the steps of stopping recording of the incoming message, turning off the speaker of the stationary main unit, and processing the incoming call.

13. The call screening method of claim 11, further comprising the steps of determining whether call request data are received, and forming the radio communication link with the cordless portable unit when it is determined that the call request data are received.

14. The call screening method of claim 13, further comprising the steps, when it is determined that the call request data are received, of stopping recording of the incoming message and turning off the speaker of the stationary main unit.

15. The call screening method of claim 13, further comprising the steps, when it is determined that the call request data are not received, of determining whether a busy tone is detected, and, when the busy tone is detected, transmitting call screen end data to the cordless portable unit and turning off the speaker of the stationary main unit and disconnecting a telephone line.

16. A call screening method of a facsimile system having a stationary main unit connected to a telephone network and a cordless portable unit which is separate from said stationary main unit, comprising the steps of:

providing said cordless portable unit with a speaker which is integrally constructed with and built into said cordless portable unit;

initiating a telephone answering function in the stationary main unit by forming a radio communication link between said stationary main unit and said cordless portable unit;

initiating a call screening function by transmitting call screen start data from said stationary main unit to said cordless portable unit over said radio communication link;

turning on the speaker of the cordless portable unit in response to reception of said call screen start data by said cordless portable unit;

recording an incoming message of an incoming call received from said telephone network in a telephone answering device of the facsimile system while performing the telephone answering function; and outputting said incoming message to the speaker of said cordless portable unit through the radio communication link while said incoming message is being simultaneously recorded in said telephone answering device so as to permit a user to screen an incoming call by using said speaker of said cordless portable unit;

said method further comprising the steps, after the step of turning on the speaker of the cordless portable unit, of determining whether a call request is received, and, when the call request is received, transmitting call request data to the stationary main unit, turning off the speaker of the cordless portable unit, and processing an incoming call.

17. A call screening method of a facsimile system having a main unit connected to a telephone network, and a portable unit that is cordless and remote from the main unit, comprising the steps of:

providing the portable unit with a speaker which is integrally constructed with and built into the portable unit;

upon detection of a ring signal from the telephone network, establishing an on-line condition between said main unit of the facsimile system and the telephone network, and transmitting call screen start data by radio from said main unit to said portable unit;

turning on the speaker of said portable unit in response to reception of said call screen start data by said portable unit;

modulating an outgoing message outputted from a telephone answering device of the facsimile system and an incoming message received from the telephone network into a radio signal, and transmitting a modulated radio signal to said portable unit; and causing said portable unit to demodulate the modulated radio signal transmitted from said main unit of the facsimile system and to output the demodulated signal radio to said speaker of said portable unit;

said method further comprising the step, after the modulating step, of receiving the incoming message;

said method further comprising the step of determining whether call request data are received, and, when it is determined that call request data are not received, determining whether a busy tone is detected, and, when it is determined that the busy tone is detected, transmitting call screen end data to the cordless portable unit, turning off the speaker of the stationary main unit and disconnecting a telephone line.

18. A call screening method of a facsimile system having a stationary main unit connected to a telephone network and a cordless portable unit which is separate from said stationary main unit, comprising the steps of:

providing said cordless portable unit with a speaker which is integrally constructed with and built into said cordless portable unit;

initiating a telephone answering function in the stationary main unit by forming a radio communication link between said stationary main unit and said cordless portable unit;

initiating a call screening function by transmitting call screen start data from said stationary main unit to said cordless portable unit over said radio communication link;

turning on the speaker of the cordless portable unit in response to reception of said call screen start data by said cordless portable unit;

recording an incoming message of an incoming call received from said telephone network in a telephone answering device of the facsimile system while performing the telephone answering function; and outputting said incoming message to the speaker of said cordless portable unit through the radio communication link while said incoming message is being simultaneously recorded in said telephone answering device so as to permit a user to screen an incoming call by using said speaker of said cordless portable unit;

wherein said stationary main unit is provided with: an operational panel connected to said controller, containing a multitude of keys for setting up or commanding functions provided from the facsimile system, and providing, to said controller, key data generated by pushing of the keys, and a display window for providing a visual display of a current operating status of the facsimile system; a scanner connected to said controller for reading image data of a recording medium and converting the read image data to binary data; and a printer connected to said controller for printing at least one of received image data and the read image data under the control of said controller.

19. The call screening method of claim 18, further comprising the steps, prior to the initiating steps, of determining whether a ring signal is detected and whether a telephone answering mode is set, and establishing an on-line condition with a public switched telephone network when it is determined that a ring signal has been detected and the telephone answering mode is set.

20. The call screening method of claim 18, further comprising the step, after the initiating steps, of outputting an outgoing message to the cordless portable unit and to a speaker of the stationary main unit.

21. The call screening method of claim 18, further comprising the steps, after said initiating steps, of determining whether a hook off condition exists when an incoming message is received, and transmitting call screen end data to the cordless portable unit when it is determined that the hook off condition exists.

22. The call screening method of claim 21, further comprising the steps of stopping recording of the incoming message, turning off the speaker of the stationary main unit, and processing the incoming call.

23. The call screening method of claim 21, further comprising the steps of determining whether call request data are received, and forming the radio communication link with the cordless portable unit when it is determined that the call request data are received.

24. The call screening method of claim 23, further comprising the steps, when it is determined that the call request data are received, of stopping recording of the incoming message and turning off the speaker of the stationary main unit.

25. The call screening method of claim 23, further comprising the steps, when it is determined that the call request data are not received, of determining whether a busy tone is detected, and, when the busy tone is detected, transmitting call screen end data to the cordless portable unit and turning off the speaker of the stationary main unit and disconnecting a telephone line.

* * * * *